(12) United States Patent
Liu et al.

(10) Patent No.: US 8,885,741 B2
(45) Date of Patent: Nov. 11, 2014

(54) METHOD, APPARATUS AND SYSTEM FOR IMPLEMENTING PRECODING

(75) Inventors: Wenhao Liu, Shenzhen (CN); Yanwen Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 93 days.

(21) Appl. No.: 13/389,526

(22) PCT Filed: Jun. 30, 2010

(86) PCT No.: PCT/CN2010/074863
§ 371 (c)(1),
(2), (4) Date: Feb. 8, 2012

(87) PCT Pub. No.: WO2010/149110
PCT Pub. Date: Dec. 29, 2010

(65) Prior Publication Data
US 2012/0263248 A1 Oct. 18, 2012

(30) Foreign Application Priority Data
Dec. 31, 2009 (CN) .......................... 2009 1 0239603

(51) Int. Cl.
*H04L 27/28* (2006.01)
*H04B 7/06* (2006.01)

(52) U.S. Cl.
CPC ............ *H04B 7/0617* (2013.01); *H04B 7/0634* (2013.01); *H04B 7/0663* (2013.01)
USPC ........................................................ 375/260

(58) Field of Classification Search
USPC .......................... 375/260, 267, 285, 295, 299
See application file for complete search history.

(56) References Cited

U.S. PATENT DOCUMENTS

| 7,995,671 | B2 * | 8/2011 | Kim et al. ..................... 375/267 |
| 8,184,726 | B2 * | 5/2012 | Hsiao et al. ................... 375/260 |
| 8,194,778 | B2 * | 6/2012 | Ko et al. ....................... 375/267 |
| 8,537,924 | B2 * | 9/2013 | Jongren et al. ................ 375/267 |

FOREIGN PATENT DOCUMENTS

| CN | 101510820 A | 8/2009 |
| CN | 101594177 A | 12/2009 |
| WO | 2009084876 A2 | 7/2009 |

OTHER PUBLICATIONS

International Search Report for PCT/CN2010/074863 dated Sep. 7, 2010.

* cited by examiner

*Primary Examiner* — Khanh C Tran
(74) *Attorney, Agent, or Firm* — Ling Wu; Stephen Yang; Ling and Yang Intellectual Property LLC (57) ABSTRACT

A method for implementing precoding includes the following steps: dividing hierarchical data which has passed through layer mapping processing into at least two paths to be received respectively (S10); splitting a precoding matrix according to the divided paths of hierarchical data, and respectively left multiplying the split precoding matrixes with the divided paths of hierarchical data (S11); and adding the data of corresponding bits of the matrixes obtained by respectively left multiplying with the divided paths of hierarchical data, to obtain precoding output data (S12). The present invention also provides an apparatus and a system for implementing precoding. The present invention, by performing the process of splitting firstly and then combining to the precoding, can realize the precoding operation with large bandwidth and multi-antenna by using the existing platform at the transmitter of the base station, thereby saving the costs and enhancing the usage flexibility.

14 Claims, 4 Drawing Sheets

METHOD, APPARATUS AND SYSTEM FOR IMPLEMENTING PRECODING

TECHNICAL FIELD

The present invention relates to precoding technique in channel transmission, and particularly, to a method, apparatus and system for implementing precoding.

BACKGROUND OF THE RELATED ART

The 3rd Generation Partner Project (3GPP) standards organization has already made clear that greater bandwidth can be realized by aggregating the existing bandwidths, in order to transmit; and at the same time, the 3GPP standards also proposes to support 8 antennas.

The hardware resources (processing resources and bandwidth resources) of the current long term evolution (LTE) base station can process the configuration of 4 antennas, 20 MHz bandwidth, but cannot support a configuration of larger bandwidth (such as 40 MHz) and/or more antennas (such as 8 antennas).

If the expansion of the bandwidth and antenna ports is realized by adopting 8 antennas, multiple component carriers (CA), the processing resources of the existing LTE platform cannot meet the demand.

CONTENT OF THE INVENTION

One of the purposes of the present invention is to provide a method, apparatus and system for implementing precoding, to implementing the precoding operation with large-bandwidth and multi-antenna.

A method for implementing precoding is provided in the present invention, comprising:

dividing hierarchical data which has passed through layer mapping processing into at least two paths to be received respectively;

splitting a precoding matrix according to the divided paths of hierarchical data, and respectively left multiplying the split precoding matrixes with the divided paths of hierarchical data; and adding the data of corresponding bits of the matrixes obtained by respectively left multiplying with the divided paths of hierarchical data, to obtain precoding output data.

Preferably, the step of splitting the precoding matrix according to the divided paths of hierarchical data, and respectively left multiplying the split precoding matrixes with the divided paths of hierarchical data comprises:

selecting the corresponding column vectors respectively from the precoding matrix according to at least two paths of hierarchical data; and respectively left multiplying the matrixes composed of the selected column vectors with the corresponding divided paths of hierarchical data.

Preferably, the number of the split precoding matrixes is consistent with the number of the divided paths of the hierarchical data.

In the step of respectively left multiplying the split precoding matrixes with the divided paths of hierarchical data, the dimensions of the matrixes obtained by respectively left multiplying with the divided paths of hierarchical data are the same.

The present invention also provides an apparatus for implementing precoding, comprising:

a division processing module, which is configured to: divide hierarchical data which has passed through layer mapping processing into at least two paths to be received respectively;

a split processing module, which is configured to: split a precoding matrix according to the divided paths of hierarchical data, and respectively left multiply the split precoding matrixes with the divided paths of hierarchical data; and a matrix addition module, which is configured to: add the data of corresponding bits of the matrixes obtained by left multiplying with the divided paths of hierarchical data, to obtain precoding output data.

Preferably, the aforementioned split processing module comprises:

a processing sub-module, which is configured to: select the corresponding column vectors respectively from the precoding matrix according to at least two paths of hierarchical data, and respectively left multiply the matrixes composed of the selected column vectors with the corresponding divided paths of hierarchical data.

Preferably, the number of the split precoding matrixes is consistent with the number of the divided paths of the hierarchical data.

Preferably, the dimensions of the matrixes obtained by respectively left multiplying with the divided paths of hierarchical data are the same.

The present invention also provides a system for implementing precoding, comprising a layer mapping unit and a precoding unit; wherein, the layer mapping unit comprises:
  a data division module, which is configured to: divide hierarchical data which has passed through layer mapping processing into at least two paths to be sent respectively; the precoding unit comprises:
  a division processing module, which is configured to: divide the hierarchical data which has passed through layer mapping processing into at least two paths to be received respectively;
  a split processing module, which is configured to: split a precoding matrix according to the divided paths of hierarchical data, and respectively left multiply the split precoding matrixes with the divided paths of hierarchical data; and
  a matrix addition module, which is configured to: add the data of corresponding bits of the matrixes obtained by left multiplying with the divided paths of hierarchical data, to obtain precoding output data.

Preferably, the aforementioned split processing module comprises:

a processing sub-module, which is configured to: select the corresponding column vectors respectively from the precoding matrix according to at least two paths of hierarchical data, and respectively left multiply the matrixes composed of the selected column vectors with the corresponding divided paths of hierarchical data.

The method, apparatus and system for implementing precoding in the present invention, by implementing precoding by layering, that is, performing the processes of splitting firstly and then combining to the precoding, can realize the precoding operation with large bandwidth and multi-antenna by using the existing platform at the transmitter of the base station, thereby saving the costs and enhancing the usage flexibility.

The realization of the purpose, function features and advantages of the present invention will be further illustrated with reference to the accompanying drawings and in combination with embodiments.

PREFERRED EMBODIMENTS OF THE PRESENT INVENTION

The present invention proposes a processing way of performing splitting firstly and then combining to the precoding, to achieve a precoding operation with large-bandwidth (such as 40 MHz) and multi-antenna (such as 8 antennas) by using the existing platform at the transmitter of the base station, thereby meeting the 3GPP requirements on antennas and bandwidth and saving the cost; and the extension is easy and the usage flexibility is enhanced.

Figure 1:
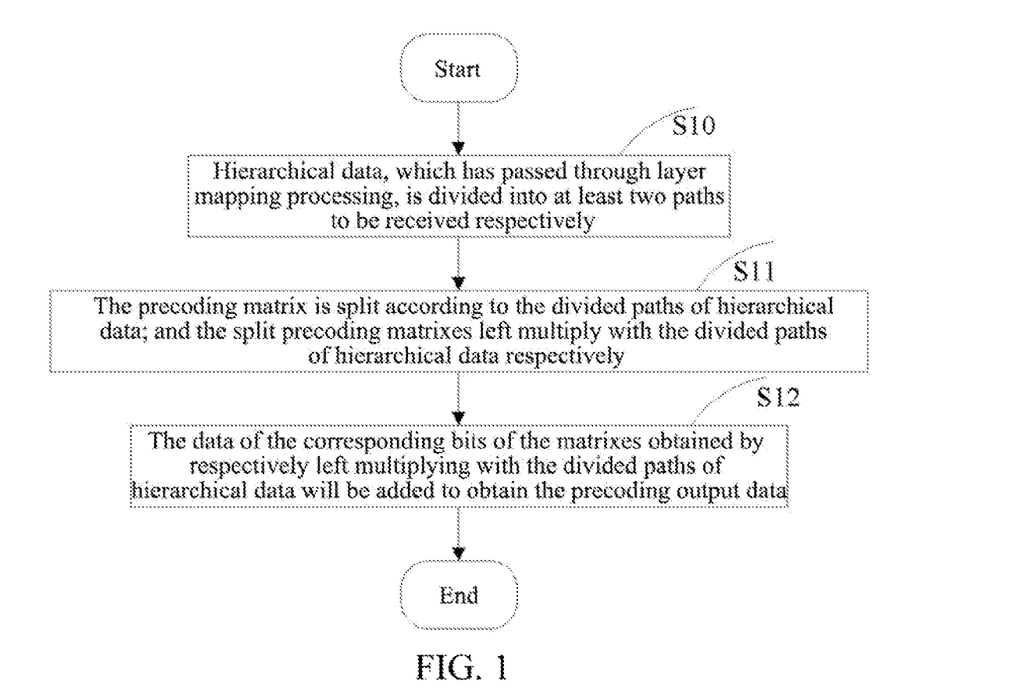
FIG. 1 is a flow chart of steps of a method for implementing precoding by layering in accordance with an embodiment of the present invention.

Referring to FIG. 1, a method for implementing precoding by layering in accordance with an embodiment of the present invention comprises:

step S10, dividing the hierarchical data which has passed through layer mapping processing into at least two paths to be received respectively;

step S11, splitting the precoding matrix according to the divided hierarchical data; and left multiplying the split precoding matrixes with the divided paths of hierarchical data respectively;

step S12, adding the data of corresponding bits of the matrixes obtained by respectively left multiplying with the divided paths of hierarchical data, to obtain the precoding output data, thereby implementing precoding by layering.

When the transmitter of the base station sends data through the antennas, firstly it processes, such as encoding and modulating, etc., the original code stream data through the baseband board; and then performs the layer mapping to generate hierarchical data, and converts the serial data into parallel data; and then performs the precoding processing to generate output data, and maps to each antenna port.

As described in step S10, during the layer processing, a single data stream usually corresponds to at most four transport layers, and the number of data streams is usually 2 at most, thus the number of transport layers is generally 8 at most.

The hierarchical data output which has passed through the layer mapping processing can be divided to be transmitted; when the number of the transport layers is 8 or less than 8, the hierarchical data can be divided into at least two paths to be transmitted, and each path is used to transmit 4 or less than 4 hierarchical data. When the number of the transport layers is more than 8, the hierarchical data can be divided into multiple paths to be transmitted, and each path is used to transmit 4 or less than 4 hierarchical data.

When performing the precoding processing, the hierarchical data, which is divided into at least two paths to be output after passing through the layer mapping processing, can be received to be processed. Each path is used to transmit 4 or less than 4 hierarchical data and is processed corresponding to a processing module, which can be performed by using the existing hardware platform when meeting the condition of performing the precoding processing of the existing hardware platform of the transmitter of the base station, thereby saving the costs.

As described in step S11, the number of split precoding matrixes is consistent with the number of divided paths of the hierarchical data. Since the hierarchical data is divided into at least two paths, the precoding matrix should be split into at least two parts. The above two paths of hierarchical data can be processed corresponding to two processing modules respectively.

Figure 2:
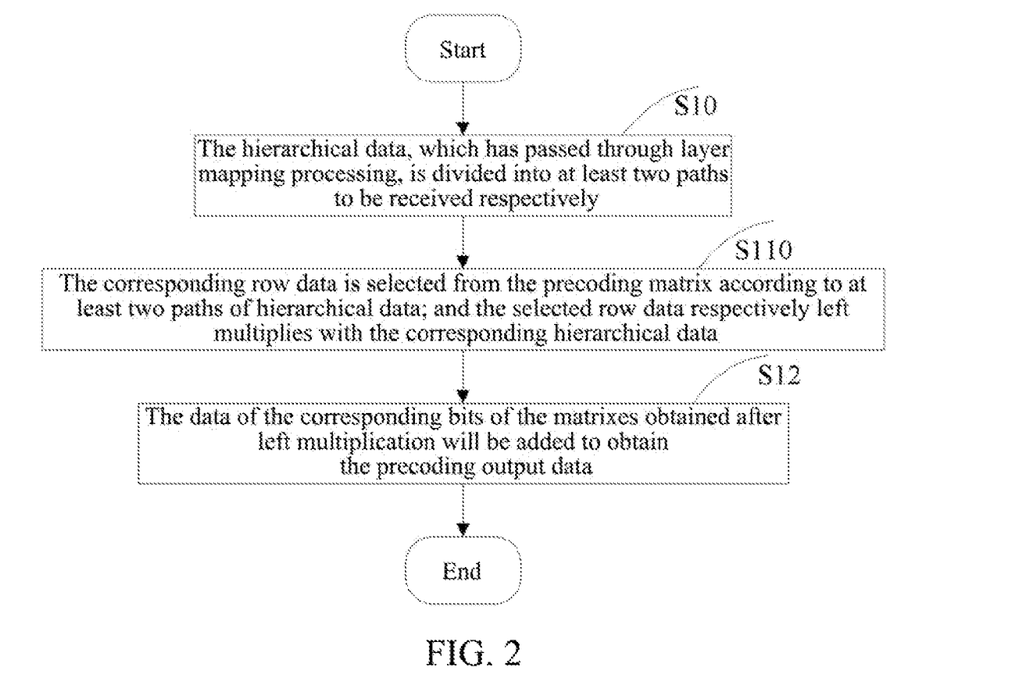
FIG. 2 is a flow chart of steps of a method for implementing precoding by layering in an example in accordance with an embodiment of the present invention.

Referring to FIG. 2, in an example of this embodiment, the aforementioned step S11 comprises the step that:

step S110, the corresponding column vectors are selected from the precoding matrix respectively according to at least two paths of hierarchical data; and matrixes composed of the selected column vectors left multiply with the corresponding hierarchical data respectively.

The corresponding column vectors can be selected from the precoding matrix according to each path of hierarchical data, and the left multiplying processing is performed to the matrixes consisting of the selected column vectors with the hierarchical data, to obtain the corresponding matrix data. The at least two paths of hierarchical data can respectively select the column vectors, the precoding matrix is split into at least two parts, and meanwhile, at least two matrix data are obtained. The dimension(s) of the at least two matrixes, which are obtained after the above left multiplication, should be the same. For example, how many layers (such as 4 layers) of the hierarchical data in a certain path, then the same number of columns (such as 4 columns) of the matrix data can be selected from the matrix from left to right in turn according to arrangement, and can be split out from the precoding matrix.

As described in step S12, the corresponding bits of the matrix data, which is obtained by left multiplying the above split precoding matrixes with the divided paths of hierarchical data, are added to obtain the precoding output data and output via the antennas.

Figure 3:
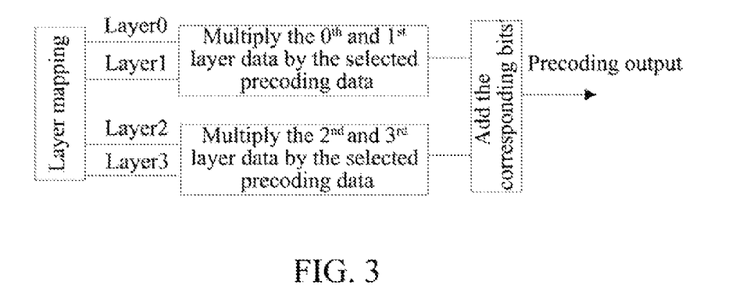
FIG. 3 is a flow chart of a first specific implementation for precoding in an embodiment of the present invention.

Referring to FIG. 3, a process for implementing precoding by layering is illustrated in the following by taking 4 transmitting antennas configuring full rank transmission for example. The flow bit stream (code stream) is divided into two paths (two transport layers per path) through the layer mapping to be output, and the two processing units configured for precoding are used to receive the two paths of hierarchical data respectively and output after performing the precoding processing.

Assuming that a certain column of the layer mapping output is:

$$\begin{bmatrix} x^{(0)}(i) \\ x^{(1)}(i) \\ x^{(2)}(i) \\ x^{(3)}(i) \end{bmatrix},$$

and the precoding matrix is:

$$\begin{bmatrix} p_{11} & p_{12} & p_{13} & p_{14} \\ p_{21} & p_{22} & p_{23} & p_{24} \\ p_{31} & p_{32} & p_{33} & p_{34} \\ p_{41} & p_{42} & p_{43} & p_{44} \end{bmatrix},$$

then the expected output data after precoding is:

$$\begin{bmatrix} p_{11}x^{(0)}(i) + p_{12}x^{(1)}(i) + p_{13}x^{(2)}(i) + p_{14}x^{(3)}(i) \\ p_{21}x^{(0)}(i) + p_{22}x^{(1)}(i) + p_{23}x^{(2)}(i) + p_{24}x^{(3)}(i) \\ p_{31}x^{(0)}(i) + p_{32}x^{(1)}(i) + p_{33}x^{(2)}(i) + p_{34}x^{(3)}(i) \\ p_{41}x^{(0)}(i) + p_{42}x^{(1)}(i) + p_{43}x^{(2)}(i) + p_{44}x^{(3)}(i) \end{bmatrix}.$$

The number of the transport layers can be not limited, for example, it can be 2, 3, or 4, and so on, herein, taking 4 transport layers for example.

One processing unit left multiplies the first and second columns of the precoding matrix with the first two layers of the input bit stream:

$$\begin{bmatrix} x^{(0)}(i) \\ x^{(1)}(i) \end{bmatrix},$$

that is $$\begin{bmatrix} p_{11} & p_{12} \\ p_{21} & p_{22} \\ p_{31} & p_{32} \\ p_{41} & p_{42} \end{bmatrix} \begin{bmatrix} x^{(0)}(i) \\ x^{(1)}(i) \end{bmatrix} = \begin{bmatrix} p_{11}x^{(0)}(i) + p_{12}x^{(1)}(i) \\ p_{21}x^{(0)}(i) + p_{22}x^{(1)}(i) \\ p_{31}x^{(0)}(i) + p_{32}x^{(1)}(i) \\ p_{41}x^{(0)}(i) + p_{42}x^{(1)}(i) \end{bmatrix};$$

The other processing unit left multiplies the third and fourth columns of the precoding matrix with the last two layers of the input bit stream $$\begin{bmatrix} x^{(2)}(i) \\ x^{(3)}(i) \end{bmatrix},$$

that is $$\begin{bmatrix} p_{13} & p_{14} \\ p_{23} & p_{24} \\ p_{33} & p_{34} \\ p_{43} & p_{44} \end{bmatrix} \begin{bmatrix} x^{(2)}(i) \\ x^{(3)}(i) \end{bmatrix} = \begin{bmatrix} p_{13}x^{(2)}(i) + p_{14}x^{(3)}(i) \\ p_{23}x^{(2)}(i) + p_{24}x^{(3)}(i) \\ p_{33}x^{(2)}(i) + p_{34}x^{(3)}(i) \\ p_{43}x^{(2)}(i) + p_{44}x^{(3)}(i) \end{bmatrix};$$

Then, add the corresponding bits of the two matrixes obtained respectively by left multiplying the precoding matrix corresponding to the hierarchical data with the corresponding two paths of hierarchical data, as follows:

$$\begin{bmatrix} p_{11}x^{(0)}(i) + p_{12}x^{(1)}(i) \\ p_{21}x^{(0)}(i) + p_{22}x^{(1)}(i) \\ p_{31}x^{(0)}(i) + p_{32}x^{(1)}(i) \\ p_{41}x^{(0)}(i) + p_{42}x^{(1)}(i) \end{bmatrix} + \begin{bmatrix} p_{13}x^{(2)}(i) + p_{14}x^{(3)}(i) \\ p_{23}x^{(2)}(i) + p_{24}x^{(3)}(i) \\ p_{33}x^{(2)}(i) + p_{34}x^{(3)}(i) \\ p_{43}x^{(2)}(i) + p_{44}x^{(3)}(i) \end{bmatrix} =$$

$$\begin{bmatrix} p_{11}x^{(0)}(i) + p_{12}x^{(1)}(i) + p_{13}x^{(2)}(i) + p_{14}x^{(3)}(i) \\ p_{21}x^{(0)}(i) + p_{22}x^{(1)}(i) + p_{23}x^{(2)}(i) + p_{24}x^{(3)}(i) \\ p_{31}x^{(0)}(i) + p_{32}x^{(1)}(i) + p_{33}x^{(2)}(i) + p_{34}x^{(3)}(i) \\ p_{41}x^{(0)}(i) + p_{42}x^{(1)}(i) + p_{43}x^{(2)}(i) + p_{44}x^{(3)}(i) \end{bmatrix}$$

That is, the final precoding output data can be obtained, and the final precoding output data is consistent with the aforementioned expected output data.

Figure 4:
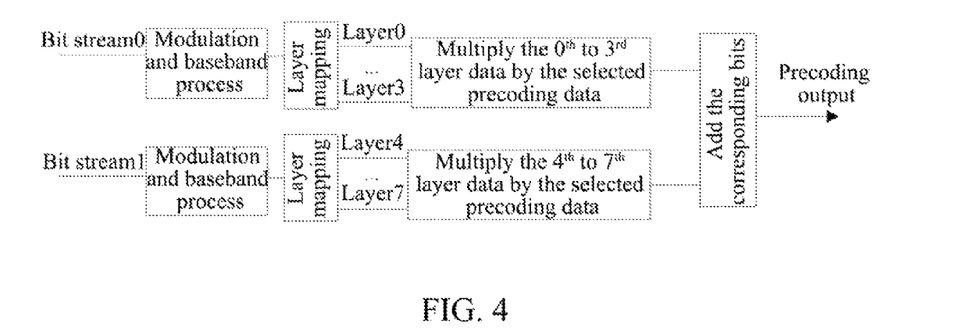
FIG. 4 is a flow chart of a second specific implementation for precoding in an embodiment of the present invention.

Referring to FIG. 4, it is illustrated in the following by taking 40 MHz bandwidth, 8-antenna configuration and the channel rank of 8 for example, and two data streams (bit streams) are respectively mapped to the 4 transport layers front and back. The precoding matrix is a 8*8 matrix, the process from the bit stream to the layer mapping can be implemented respectively with the symbol-level process and bit-level process of the existing LTE baseband board, and then the baseband board continues to use for precoding. It comprises that:

firstly, the layer mapping outputs are respectively layer0 to layer3 and layer4 to layer7. The bit stream0 is mapped to the layer0 to layer3, that is, $$x^{(0)}(i) = d^{(0)}(4i)$$

$$x^{(1)}(i) = d^{(0)}(4i+1)$$

$$x^{(2)}(i) = d^{(0)}(4i+2)$$

$$x^{(3)}(i) = d^{(0)}(4i+3),$$

where, $d^{(0)}$ denotes the bit stream0, $x^{(n)}$ denotes the $n^{th}$ layer data, and $$\begin{bmatrix} x^{(0)}(i) \\ x^{(1)}(i) \\ x^{(2)}(i) \\ x^{(3)}(i) \end{bmatrix}$$

records as dLayer0. The bit stream1 is mapped to the layer4 to layer7, that is, $$x^{(4)}(i) = d^{(1)}(4i)$$

$$x^{(5)}(i) = d^{(1)}(4i+1)$$

$$x^{(6)}(i) = d^{(1)}(4i+2)$$

$$x^{(7)}(i) = d^{(1)}(4i+3),$$

where, $d^{(1)}$ denotes the bit stream1, and $$\begin{bmatrix} x^{(4)}(i) \\ x^{(5)}(i) \\ x^{(6)}(i) \\ x^{(7)}(i) \end{bmatrix}$$

records as dLayer1.

Then the precoding matrix is split; the precoding matrix $P=[p_1\ p_2\ p_3\ p_4\ p_5\ p_6\ p_7\ p_8]$, $p_i$ is the $i^{th}$ layer precoding vector, and the first four columns of the precoding matrix P can be used to left multiply with the layer mapping output dLayer0 of the bit stream0, that is, $[p_1\ p_2\ p_3\ p_4]$*dLayer0, and the result of the left multiplication is a 8*n two-dimensional array; similarly, the last four columns of the precoding matrix P can be used to left multiply with the layer mapping output dLayer1 of the bit stream1, that is, $[p_5\ p_6\ p_7\ p_8]$*dLayer1.

Again, the corresponding bits of the two output two-dimensional arrays are added to obtain the precoding data that can be output.

Figure 5:
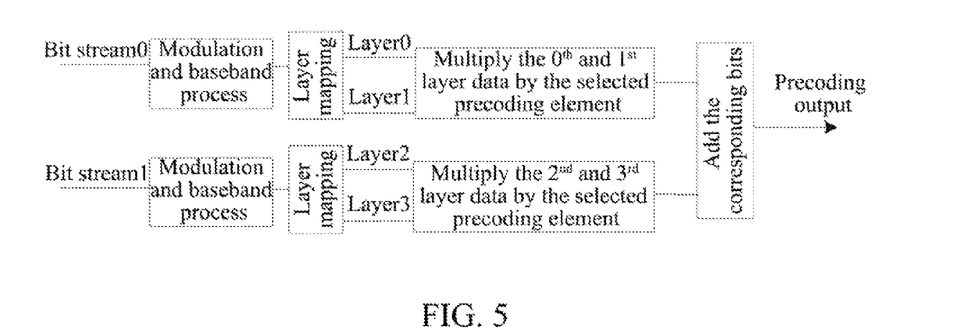
FIG. 5 is a flow chart of a third specific implementation for precoding in an embodiment of the present invention.

Referring to FIG. 5, it is illustrated in the following by taking 40 MHz bandwidth, 4-antenna configuration and the channel rank of 4 for example, and two data streams (bit streams) are respectively mapped to two transport layers. It comprises that:

firstly, the layer mapping outputs are respectively layer0, layer1 and layer2, layer3. The bit stream0 is mapped to the layer0 and layer1, that is, $$x^{(0)}(i) = d^{(0)}(2i)$$
$$x^{(1)}(i) = d^{(0)}(2i+1),$$

where, $d^{(O)}$ denotes the bit stream0, $x^{(n)}$ denotes the $n^{th}$ layer data, and $$\begin{bmatrix} x^{(0)}(i) \\ x^{(1)}(i) \end{bmatrix}$$

records as dLayer0; and the bit stream1 is mapped to the layer2 and layer3, that is, $$x^{(2)}(i) = d^{(1)}(2i)$$
$$x^{(3)}(i) = d^{(1)}(2i+1),$$

where, $d^{(l)}$ denotes the bit stream1, and $$\begin{bmatrix} x^{(2)}(i) \\ x^{(3)}(i) \end{bmatrix}$$

records as dLayer1.

Then the precoding matrix is split; the precoding matrix $P=[p_1\ p_2\ p_3\ p_4]$, $p_i$ is the $i^{th}$ layer precoding vector; and the first two columns of the precoding matrix P can be used to left multiply with the layer mapping output dLayer0 of the bit stream0, that is, $[p_1\ p_2]$*dLayer0, and the result is a 4*n two-dimensional array; similarly, the last two columns of the precoding matrix P can be used to left multiply with the layer mapping output dLayer1 of the bit stream1, that is, $[p_3\ p_4]$*dLayer1.

Again, the corresponding bits of the two output two-dimensional arrays are added to obtain the precoding data that can be output.

Figure 6:
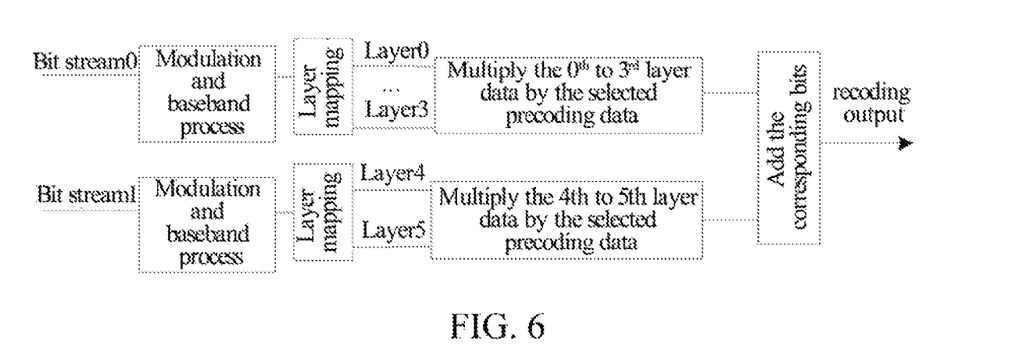
FIG. 6 is a flow chart of a fourth specific implementation for precoding in an embodiment of the present invention.

Referring to FIG. 6, it is illustrated in the following by taking 40 MHz bandwidth, 8-antenna configuration and the channel rank of 6 for example, one data stream (bit stream0) is mapped to the first 4 transport layers (layer0 to layer3), and the other data stream (bit stream1) is mapped to the last two transport layers (layer4, layer5). The precoding matrix is a 8*6 matrix, the process of the bit streams to the layer mapping can be implemented respectively with the symbol-level process and bit-level process of the existing LTE baseband board, and then the baseband board continues to use for precoding. It comprises that:

firstly, the layer mapping outputs are respectively layer0 to layer3 and layer4 to layer5. The bit stream0 is mapped to the layer0 to layer3, that is, $$x^{(0)}(i) = d^{(0)}(4i)$$
$$x^{(1)}(i) = d^{(0)}(4i+1)$$
$$x^{(2)}(i) = d^{(0)}(4i+2)$$
$$x^{(3)}(i) = d^{(0)}(4i+3),$$

where, $d^{(O)}$ denotes the bit stream0, $x^{(n)}$ denotes the $n^{th}$ layer data, and $$\begin{bmatrix} x^{(0)}(i) \\ x^{(1)}(i) \\ x^{(2)}(i) \\ x^{(3)}(i) \end{bmatrix}$$

records as dLayer0; and the bit stream1 is mapped to the layer4 to layer5, that is, $$x^{(4)}(i) = d^{(1)}(2i)$$
$$x^{(5)}(i) = d^{(1)}(2i+1),$$

where, $d^{(1)}$ denotes the bit stream1, and $$\begin{bmatrix} x^{(4)}(i) \\ x^{(5)}(i) \end{bmatrix}$$

records as dLayer1.

Then the precoding matrix is split; the precoding matrix $P=[p_1\ p_2\ p_3\ p_4\ p_5, p_6]$, $p_i$ is the precoding vector of the $i^{th}$ layer; and the first four columns of the precoding matrix P can be used to left multiply with the layer mapping output dLayer0 of the bit stream0, that is, $[p_1\ p_2\ p_3\ p_4]$*dLayer0, and the result is a 8*n two-dimensional array; similarly, the last two columns of the precoding matrix P can be used to left multiply with the layer mapping output dLayer1 of the bit stream1, that is, $[p_5\ p_6]$*dLayer1, and the result is a 4*n two-dimensional array.

Again, the corresponding bits of the two output two-dimensional arrays are added to obtain the precoding data that can be output.

Figure 7:
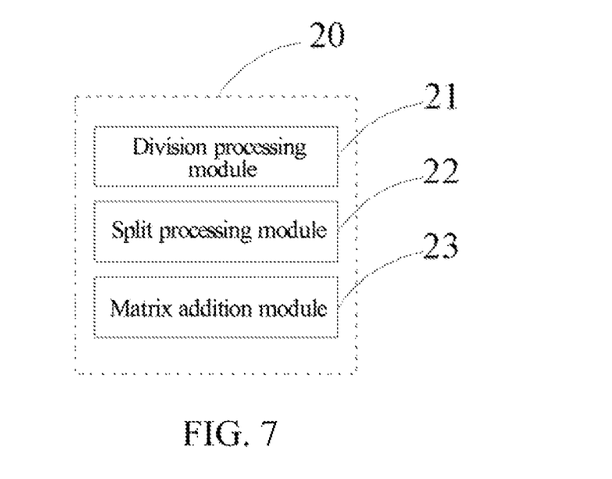
FIG. 7 is a structural diagram of an apparatus for implementing precoding by layering in accordance with another embodiment of the present invention.

Referring to FIG. 7, an apparatus 20 for implementing precoding by layering in accordance with another embodiment of the present invention is proposed, and the apparatus 20 comprises:

a division processing module 21, which is configured to: divide the hierarchical data which has passed through layer mapping processing into at least two paths to be received respectively;

a split processing module 22, which is configured to: split the precoding matrix according to the divided paths of hierarchical data, and respectively left multiply the split precoding matrixes with the divided paths of hierarchical data; and a matrix addition module 23, which is configured to: add the data of corresponding bits of the matrixes obtained by respectively left multiplying the divided paths of hierarchical data to obtain the precoding output data.

During the layer processing, a single data stream usually corresponds to four transport layers at most, and the number of data streams is usually at most 2, thus the number of transport layers is generally at most 8.

The divided transmission can be performed to the hierarchical data output after the layer mapping processing; and when the number of the transport layers is 8 or less than 8, the hierarchical data can be divided into at least two paths to be transmitted, and each path is used to transmit 4 or less than 4 hierarchical data. When the number of the transport layers is more than 8, the hierarchical data can be divided into multiple paths to be transmitted, and each path is used to transmit 4 or less than 4 hierarchical data.

The aforementioned division processing module 21 is configured to: during the precoding processing, receive the hierarchical data output by dividing into at least two paths after the layer mapping processing and process. Each path is used to transmit 4 or less than 4 hierarchical data, which can be performed by using the existing hardware platform when meeting the condition of performing the precoding processing of the existing hardware platform of the transmitter of the base station, thereby saving the costs.

The aforementioned split processing module 22 is configured to split the precoding matrix according to the divided paths of hierarchical data; and respectively left multiply the split precoding matrixes with the divided paths of hierarchical data. The number of the split precoding matrixes is consistent with the number of the divided paths of the hierarchical data. Since the number of the divided paths of the hierarchical data is at least two paths, the precoding matrix should be split into at least two parts.

Figure 8:
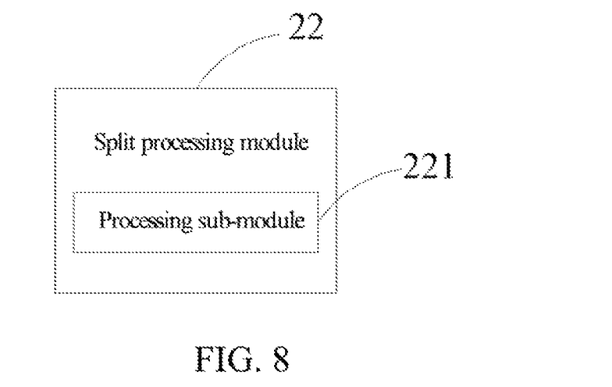
FIG. 8 is a structural diagram of an apparatus for implementing precoding by layering in an example in accordance with another embodiment of the present invention.

Referring to FIG. 8, in an example of this embodiment, the aforementioned split processing module 22 comprises:

the processing sub-module 221, which is configured to: select the corresponding column vectors respectively from the precoding matrix according to at least two paths of hierarchical data; and respectively left multiply the matrixes composed of the selected column vectors with the corresponding hierarchical data.

The aforementioned matrix addition module 23 is configured to add the corresponding bits of the matrix data obtained by respectively left multiplying the above spilt precoding matrixes with the divided paths of hierarchical data, to get the precoding output data and output the data via the antennas. The dimensions of the matrixes obtained after the aforementioned left multiplication are the same.

Figure 9:
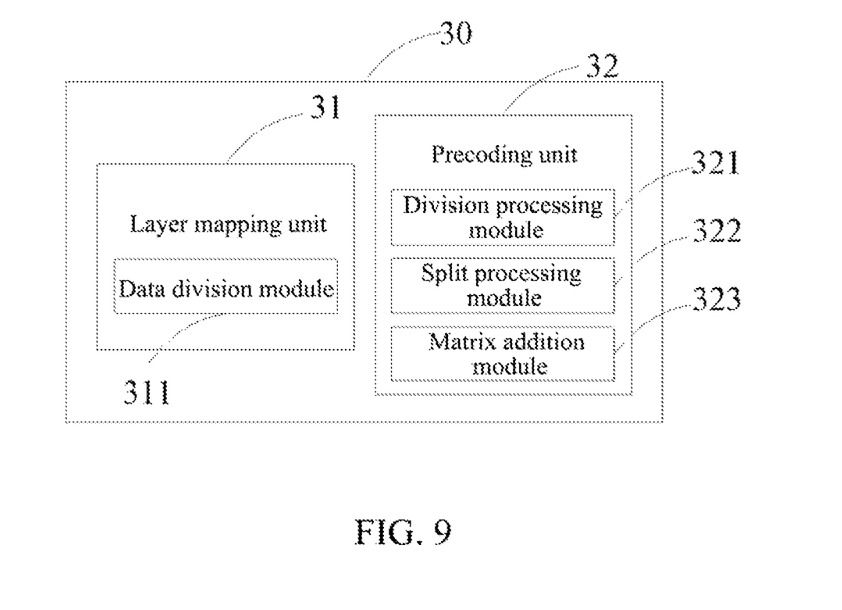
FIG. 9 is a structural diagram of a system for implementing precoding by layering in accordance with another embodiment of the present invention.

Referring to FIG. 9, a system 30 for implementing precoding by layering in accordance with another embodiment of the present invention is proposed, and the system comprises a layer mapping unit 31 and a precoding unit 32, wherein, the layer mapping unit 31 comprises:

a data division module 311, which is configured to: divide the hierarchical data which has passed through the layer mapping processing into at least two paths to be sent respectively;

the precoding unit 32 comprises:

a division processing module 321, which is configured to: divide the hierarchical data which has passed through the layer mapping processing into at least two paths to be received respectively;

a split processing module 322, which is configured to: split the precoding matrix according to the divided paths of hierarchical data; and respectively left multiply the split precoding matrixes with the divided paths of hierarchical data; and a matrix addition module 323, which is configured to: add the data of corresponding bits of the matrixes obtained by respectively left multiplying with the divided paths of hierarchical data, to obtain the precoding output data.

During the layer processing, a single data stream usually corresponds to four transport layers at most, and the number of data streams is usually 2 at most, thus the number of transport layers is generally 8 at most.

The above data division module 311 of the layer mapping unit 31 can perform divided transmission to the hierarchical data output after the layer mapping processing; and when the number of the transport layers is 8 or less than 8, the hierarchical data can be divided into at least two paths to be transmitted, and each path is used to transmit 4 or less than 4 hierarchical data. When the number of the transport layers is more than 8, the hierarchical data can be divided into multiple paths to be transmitted, and each path is used to transmit 4 or less than 4 hierarchical data.

The division processing module 321 of the aforementioned precoding unit 32 is configured to: during the precoding processing, receive the hierarchical data output by dividing into at least two paths after the layer mapping processing and process. Each path is used to transmit 4 or less than 4 hierarchical data, which can be performed by using the existing hardware platform when meeting the conditions of performing the precoding processing of the existing hardware platform of the transmitter of the base station, thereby saving the costs.

The aforementioned split processing module 322 of the precoding unit 32 is configured to split the precoding matrix according to the divided paths of hierarchical data; and respectively left multiply the split precoding matrixes with the divided paths of hierarchical data. The number of the above split precoding matrixes is consistent with the number of the divided paths of the hierarchical data. Since the number of the divided paths of the hierarchical data is at least two paths, the precoding matrix should be split into at least two parts.

Figure 10:
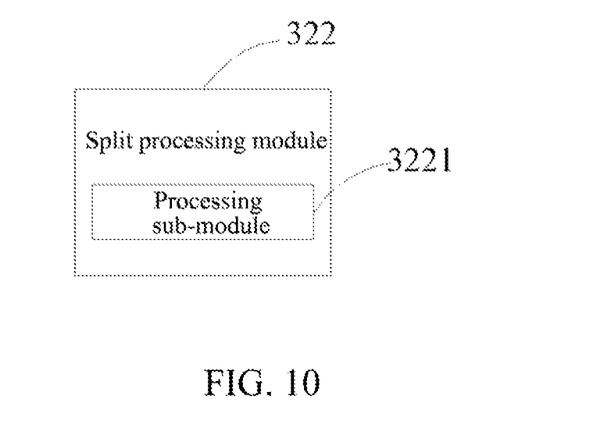
FIG. 10 is a structural diagram of a system for implementing precoding by layering in an example in accordance with another embodiment of the present invention.

Referring to FIG. 10, in an example of the present embodiment, the aforementioned split processing module 322 comprises:

the processing sub-module 3221, which is configured to: select the corresponding column vectors respectively from the precoding matrix according to at least two paths of hierarchical data; and respectively left multiply the matrixes composed of the selected column vectors with the corresponding hierarchical data.

The matrix addition module 323 of the aforementioned precoding unit 32 can add the corresponding bits of the matrix data obtained by respectively left multiplying the split precoding matrixes with the divided paths of hierarchical data, to obtain the precoding output data, and match the output data to each antenna port. The dimensions of the matrixes obtained after the aforementioned left multiplication are the same.

For those skilled in the art, it can be understood that all or part of steps in the aforementioned method can be implemented by programs instructing the relevant hardware, and the programs can be store in a computer readable storage medium, such as a Read-Only-Memory, a magnetic disk or an optical disk, and so on. Optionally, all or part of the steps in the aforementioned embodiments can be implemented with one or more integrated circuits. Accordingly, each module/unit in the aforementioned embodiments can be implemented in the form of either hardware or software function module. The present invention is not limited to any specific form of the combination of hardware and software.

The above description is only the preferred embodiments of the present invention and is not intended to limit the scope of the present invention, and all the equivalent structures or the equivalent flow conversion made with the use of the specification and the accompanying drawings of the present invention, or used directly or indirectly in other related technical fields, should fall into the patent protecting scope of the present invention.

INDUSTRIAL APPLICABILITY

The present invention, by performing the processes of splitting firstly and then combining to the precoding, can realize the precoding operation with large bandwidth and multi-antenna by using the existing platform at the transmitter of the base station, thereby saving the costs and enhancing the usage flexibility.

What is claimed is:

1. A method for implementing precoding, comprising:
    dividing hierarchical data which has passed through layer mapping processing into at least two paths to be received respectively;
    splitting a precoding matrix according to the divided hierarchical data, and respectively left multiplying the split precoding matrices with the divided paths of hierarchical data; and
    adding the data of corresponding bits of the matrices obtained by respectively left multiplying with the divided paths of hierarchical data, to obtain the precoding output data.

2. The method of claim 1, wherein, the step of splitting the precoding matrix according to the divided paths of hierarchical data, and respectively left multiplying the split precoding matrices with the divided paths of hierarchical data comprises:
    selecting the corresponding column vectors respectively from the precoding matrix according to at least two paths of hierarchical data; and
    respectively left multiplying the matrixes composed of the selected column vectors with the corresponding divided paths of hierarchical data.

3. The method of claim 2, wherein, in the step of respectively left multiplying the split precoding matrices with the divided paths of hierarchical data, the dimensions of the matrices obtained by respectively left multiplying with the divided paths of hierarchical data are the same.

4. The method of claim 1, wherein, the number of the split precoding matrices is consistent with the number of the divided paths of the hierarchical data.

5. The method of claim 4, wherein, in the step of respectively left multiplying the split precoding matrices with the divided paths of hierarchical data, the dimensions of the matrices obtained by respectively left multiplying with the divided paths of hierarchical data are the same.

6. The method of claim 1, wherein, in the step of respectively left multiplying the split precoding matrices with the divided paths of hierarchical data, the dimensions of the matrices obtained by respectively left multiplying with the divided paths of hierarchical data are the same.

7. An apparatus for implementing precoding, comprising at least one computer readable non-transitory memory medium storing following modules and at least one processor executing the modules stored in the memory medium:

a division processing module, which is configured to: divide hierarchical data which has passed through layer mapping processing into at least two paths to be received respectively;
a split processing module, which is configured to: split a precoding matrix according to the divided paths of hierarchical data, and respectively left multiply the split precoding matrices with the divided paths of hierarchical data; and
a matrix addition module, which is configured to: add the data of corresponding bits of the matrices obtained by left multiplying with the divided paths of hierarchical data, to obtain the precoding output data.

8. The apparatus of claim 7, wherein, the split processing module comprises:
a processing sub-module, which is configured to: select the corresponding column vectors respectively from the precoding matrix according to at least two paths of hierarchical data, and respectively left multiply the matrices composed of the selected column vectors with the corresponding divided paths of hierarchical data.

9. The apparatus of claim 8, wherein, the dimensions of the matrices obtained by respectively left multiplying with the divided paths of hierarchical data are the same.

10. The apparatus of claim 7, wherein, the number of the split precoding matrices is consistent with the number of the divided paths of the hierarchical data.

11. The apparatus of claim 10, wherein, the dimensions of the matrices obtained by respectively left multiplying with the divided paths of hierarchical data are the same.

12. The apparatus of claim 7, wherein, the dimensions of the matrices obtained by respectively left multiplying with the divided paths of hierarchical data are the same.

13. A system for implementing precoding, comprising at least one computer readable non-transitory memory medium storing a layer mapping unit and a precoding unit, and at least one processor executing modules included in the units that are stored in said at least one computer readable non-transitory memory medium, wherein:
    the layer mapping unit comprises:
        a data division module, which is configured to: divide hierarchical data which has passed through layer mapping processing into at least two paths to be sent respectively;
    the precoding unit comprises:
        a division processing module, which is configured to: divide the hierarchical data which has passed through layer mapping processing into at least two paths to be received respectively;
        a split processing module, which is configured to: split a precoding matrix according to the divided paths of hierarchical data, and respectively left multiply the split precoding matrices with the divided paths of hierarchical data; and
        a matrix addition module, which is configured to: add the data of corresponding bits of the matrices obtained by left multiplying with the divided paths of hierarchical data, to obtain the precoding output data.

14. The system of claim 13, wherein, the split processing module comprises:
a processing sub-module, which is configured to: select the corresponding column vectors respectively from the precoding matrix according to at least two paths of hierarchical data, and respectively left multiply the matrices composed of the selected column vectors with the corresponding divided paths of hierarchical data.

* * * * *